(12) United States Patent
Inoue et al.

(10) Patent No.: US 12,491,555 B2
(45) Date of Patent: Dec. 9, 2025

(54) MANUFACTURING METHOD AND ACCURACY MANAGEMENT METHOD

(71) Applicant: HONDA MOTOR CO., LTD., Tokyo (JP)

(72) Inventors: Yutaro Inoue, Tokyo (JP); Kota Kobayashi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 383 days.

(21) Appl. No.: 18/363,762

(22) Filed: Aug. 2, 2023

(65) Prior Publication Data

US 2024/0100585 A1 Mar. 28, 2024

(30) Foreign Application Priority Data

Sep. 27, 2022 (CN) .......................... 202211185199.0

(51) Int. Cl.
*B21D 53/88* (2006.01)
*G06F 30/15* (2020.01)
*G06F 30/23* (2020.01)
*G06F 119/18* (2020.01)

(52) U.S. Cl.
CPC ............. *B21D 53/88* (2013.01); *G06F 30/15* (2020.01); *G06F 30/23* (2020.01); *G06F 2119/18* (2020.01)

(58) Field of Classification Search
CPC ...... B21D 53/88; B21D 39/021; B21D 39/02; G06F 30/15; G06F 30/23; G06F 2119/18; G06F 2113/24; G06F 2111/04; G06F 2111/10
See application file for complete search history.

(56) References Cited

U.S. PATENT DOCUMENTS

| 6,923,036 B1 * | 8/2005 | Stefanek | ............... B21D 39/021 |
| | | | 29/243.58 |
| 2012/0297854 A1 * | 11/2012 | Cyrek | .................. B21D 39/023 |
| | | | 29/243.58 |
| 2019/0176590 A1 * | 6/2019 | Choi | ...................... B60J 5/0484 |

FOREIGN PATENT DOCUMENTS

| JP | 2006015394 A | 1/2006 | |
| WO | WO-2009113767 A2 * | 9/2009 | ........... B21D 19/043 |
| WO | WO-2011021705 A1 * | 2/2011 | ........... B60N 2/4221 |

\* cited by examiner

*Primary Examiner* — Kidest Worku
(74) *Attorney, Agent, or Firm* — CKC & PARTNERS CO., LLC

(57) ABSTRACT

Included are: an averaging process of performing averaging on measurement data in accordance with a ratio of amounts of deformation calculated in a first analysis process at other evaluation portions than a certain evaluation portion, with respect to the certain evaluation portion; an adjustment process of adjusting the ratio to achieve a higher correlation between a ratio of rigidity calculated from results of analyses between a second member and a first member and a ratio of movement calculated from the measurement data; and a rigidity changing process of changing, when a value of the measurement data at one of the evaluation portions on the completed member exceeds an allowable value, rigidity of the second member based on the correlation having undergone the adjustment in the adjustment process to allow the value of the measurement data to be below the allowable value.

4 Claims, 10 Drawing Sheets

| MEDIAN VALUE OF MEASUREMENT DATA | FR 7H | FR 6H | FR 5H | FR 4H | FR 3H | FR 2H | FR 1H | Side 6T | Side 7T | Side 8T | Side 9T | Side 10T | Side 11T | Side 12T | Side 13T | Side 14T | Side 15T | RR 1H | RR 2H |
|---|---|---|---|---|---|---|---|---|---|---|---|---|---|---|---|---|---|---|---|
| STEP SKIN | 7.4 | 3.9 | 2.3 | 0.7 | 0.1 | 1.5 | 3.5 | 3.7 | 2.7 | 1.9 | 1.2 | 0.7 | 0.3 | 0.1 | 0.1 | 0.2 | 0.4 | 0.4 | 0.6 |
| STEP SUB | -0.6 | -0.6 | 0.2 | -0.1 | -0.3 | -0.3 | 0.1 | -0.6 | -0.5 | 0.0 | 0.0 | -0.1 | -0.1 | -0.4 | -1.0 | -0.8 | -0.2 | -0.7 | -0.8 |
| STEP FULL | 0.0 | -0.3 | -0.1 | -0.4 | -0.7 | -0.5 | -0.1 | -0.5 | -0.5 | 0.0 | 0.2 | 0.2 | 0.3 | 0.2 | 0.0 | 0.2 | 0.5 | 0.0 | -0.8 |

A3

MANUFACTURING METHOD AND ACCURACY MANAGEMENT METHOD

CROSS REFERENCE TO RELATED APPLICATIONS

This application claims the benefit of priority to Chinese Patent Application No. CN202211185199.0 filed on Sep. 27, 2022. The entire contents of this application are hereby incorporated herein by reference.

BACKGROUND OF THE INVENTION

Field of the Invention

The present invention relates to a manufacturing method and an accuracy management method for a part used in a vehicle. In particular, the present invention relates to a technology of predicting the rigidity of a frame and the fitting accuracy for a part that undergoes hemming processing.

Related Art

Japanese Unexamined Patent Application, Publication No. 2006-15394 discloses a method of easily analyzing, for a hemming structure in which a flange of an outer panel having a main body and a flange extending from an end position of the main body are folded through hemming processing using a mold to be in surface contact with an edge of an inner panel to join the outer panel and the inner panel to each other, a spring-back phenomenon that is observed after the restriction by the mold is released.

Specifically, in the shape data of the outer panel and the inner panel after the hemming processing is completed, friction occurring due to the surface contact between the inner panel and the outer panel when a predetermined location on the outer panel and a predetermined location on the inner panel are joined to each other and adhesion due to a filled sealing agent are approximated to analyze a spring-back phenomenon. Thereby, a spring-back phenomenon is easily analyzed, making it possible to promptly predict the shapes of the inner panel and the outer panel after the spring-back phenomenon has occurred. As a result, described is a method that enables conditions for hemming processing to be studied in advance, which makes it possible for a surface difference between a product shape after having undergone hemming processing and a design shape to be below a reference value.

Patent Document 1: Japanese Unexamined Patent Application, Publication No. 2006-15394

SUMMARY OF THE INVENTION

In a step of hemming processing, the hemming processing is performed when a plurality of sub-completed parts are in a marriage state, that is, are in a combined state. When a target part is a door member part, for example, hemming processing is performed in a state where an inner panel and an outer panel are combined with each other. Then, in the example of the door member part, the rigidity and the accuracy of the inner panel and the outer panel are regarded as important factors for determining a joining position, that is, a step on the door member part.

However, in the conventional technologies, one analyzed and evaluated through a simulation and an actual product do not always coincide with each other. Therefore, there is no relation observed between the rigidity per point on a sub-completed part and an amount of movement in the processing at the point. In view of such issues as described above, an object of the present invention is to provide a manufacturing method and an accuracy management method that make it possible to adjust the accuracy of a completed member based on an evaluation per point on a sub-completed part.

A manufacturing method according to the present invention is a manufacturing method for a completed member in which a flange of a first member is folded through hemming processing to be in surface contact with an edge of a second member to form a folded portion to join the first member and the second member to each other, the manufacturing method including: a first analysis process of analyzing, with a finite element method using a model of the completed member, a ratio, among a plurality of evaluation portions provided on the folded portion, between an amount of deformation at a certain one of the evaluation portions when a load is applied to the certain one of the evaluation portions and amounts of deformation at other ones of the evaluation portions than the certain one of the evaluation portions when the load is applied to the certain one of the evaluation portions; a second analysis process of analyzing, with a finite element method using a model of the second member, and when a load is applied to each of a plurality of evaluation portions provided on an end at an edge of the second member, an amount of deformation at the certain one of the evaluation portions; a measurement data acquisition process of acquiring measurement data of portions corresponding to the plurality of evaluation portions on the first member and the second member before having undergone the hemming processing and measurement data of a plurality of evaluation portions on the folded portion of the completed member formed through the hemming processing; an averaging process of performing averaging on the measurement data in accordance with a ratio of amounts of deformation calculated in the first analysis process at the other ones of the evaluation portions than the certain one of the evaluation portions, with respect to the certain one of the evaluation portions; an adjustment process of adjusting the ratio to achieve a higher correlation between a ratio of rigidity between the second member and the first member, calculated from results of analyses in the first analysis process and the second analysis process, and a ratio of movement between the second member and the first member in the measurement data, calculated from the measurement data having undergone the averaging in the averaging process; a rigidity changing process of changing, when a value of the measurement data at one of the evaluation portions on the completed member exceeds an allowable value, rigidity of the second member based on the correlation having undergone the adjustment in the adjustment process to allow the value of the measurement data to be below the allowable value; and a manufacturing process of manufacturing the completed member using the second member that has been changed in rigidity in the rigidity changing process.

With the manufacturing method described above, where the averaging process is provided, it is possible to evaluate a relation in which influences by peripheral portions are taken into account, compared with a conventional evaluation per point, that is, per evaluation portion. Furthermore, with the adjustment process allowing a ratio of movement and a ratio of rigidity to have a correlation, it is possible to predict the accuracy of a completed member from a result of analysis. By changing the rigidity of the second member such as the inner panel based on the evaluation, it is possible to perform a more accurate and easy adjustment of the accuracy of a completed member. In addition, it is possible to manufacture the completed member at higher accuracy.

An accuracy management method according to the present invention is an accuracy management method of managing, when a flange of a first member is folded through hemming processing to be in surface contact with an edge of a second member to form a folded portion to join the first member and the second member to each other to form a completed member, accuracy of the folded portion, the accuracy management method including: a first analysis process of analyzing, with a finite element method using a model of the completed member, a ratio, among a plurality of evaluation portions provided on the folded portion, between an amount of deformation at a certain one of the evaluation portions when a load is applied to the certain one of the evaluation portions and amounts of deformation at other ones of the evaluation portions than the certain one of the evaluation portions when the load is applied to the certain one of the evaluation portions; a second analysis process of analyzing, with a finite element method using a model of the second member, and when a load is applied to each of a plurality of evaluation portions provided on an end at an edge of the second member, an amount of deformation at the certain one of the evaluation portions; a measurement data acquisition process of acquiring measurement data of portions corresponding to the plurality of evaluation portions on the first member and the second member before having undergone the hemming processing and measurement data of a plurality of evaluation portions on the folded portion of the completed member formed through the hemming processing; an averaging process of performing averaging on the measurement data in accordance with a ratio of amounts of deformation calculated in the first analysis process at the other ones of the evaluation portions than the certain one of the evaluation portions, with respect to the certain one of the evaluation portions; an adjustment process of adjusting the ratio to achieve a higher correlation between a ratio of rigidity between the second member and the first member, calculated from results of analyses in the first analysis process and the second analysis process, and a ratio of movement between the second member and the first member in the measurement data, calculated from the measurement data having undergone the averaging in the averaging process; and a rigidity changing process of changing, when a value of the measurement data at one of the evaluation portions on the completed member exceeds an allowable value, rigidity of the second member based on the correlation having undergone the adjustment in the adjustment process to allow the value of the measurement data to be below the allowable value.

With the accuracy management method as described above, where the averaging process is provided, it is possible to evaluate a relation in which influences by peripheral portions are taken into account, compared with a conventional evaluation per point, that is, per evaluation portion. Furthermore, with the adjustment process allowing a ratio of movement and a ratio of rigidity to have a correlation, it is possible to predict the accuracy of a completed member from a result of analysis. By changing the rigidity of the second member such as the inner panel based on the evaluation, it is possible to perform a more accurate and easy adjustment of the accuracy of a completed member.

In the measurement data acquisition process in the accuracy management method according to the present invention, a median value of results of measurements of a plurality of workpieces is used as the measurement data.

In a state where a workpiece that is a target to be measured is placed on a flat surface, while preventing it from being forcibly displaced by a clamp, for example, and an amount of displacement is measured, there may occur a setting error. With the accuracy management method as described above, it is possible to reduce errors due to influences by such a setting error.

In the adjustment process in the accuracy management method according to the present invention, a difference between a result of analysis of the completed member in the first analysis process and a result of analysis of the second member in the second analysis process is calculated to serve as a result of analysis of the first member.

With the accuracy management method as described above, where no result of analysis of a single first member such as an outer panel is used, a result of analysis is calculated from a difference between the completed member and the second member such as an inner panel. Therefore, it is possible to handle a result of analysis as an analysis in which influences due to deformation by the second member such as an inner panel are taken into account, making it possible to acquire a result of analysis in which actual deformation is taken into account.

According to the present invention, it is possible to provide a manufacturing method and an accuracy management method that make it possible to adjust the accuracy of a completed member based on an evaluation per point on a sub-completed part.

BRIEF DESCRIPTION OF THE DRAWINGS

FIG. 4 is a view illustrating results of analyses in a first analysis process on the completed member;

FIG. 7 is a view illustrating measurement data acquired in a measurement data acquisition process;

DETAILED DESCRIPTION OF THE INVENTION

Figure 1:
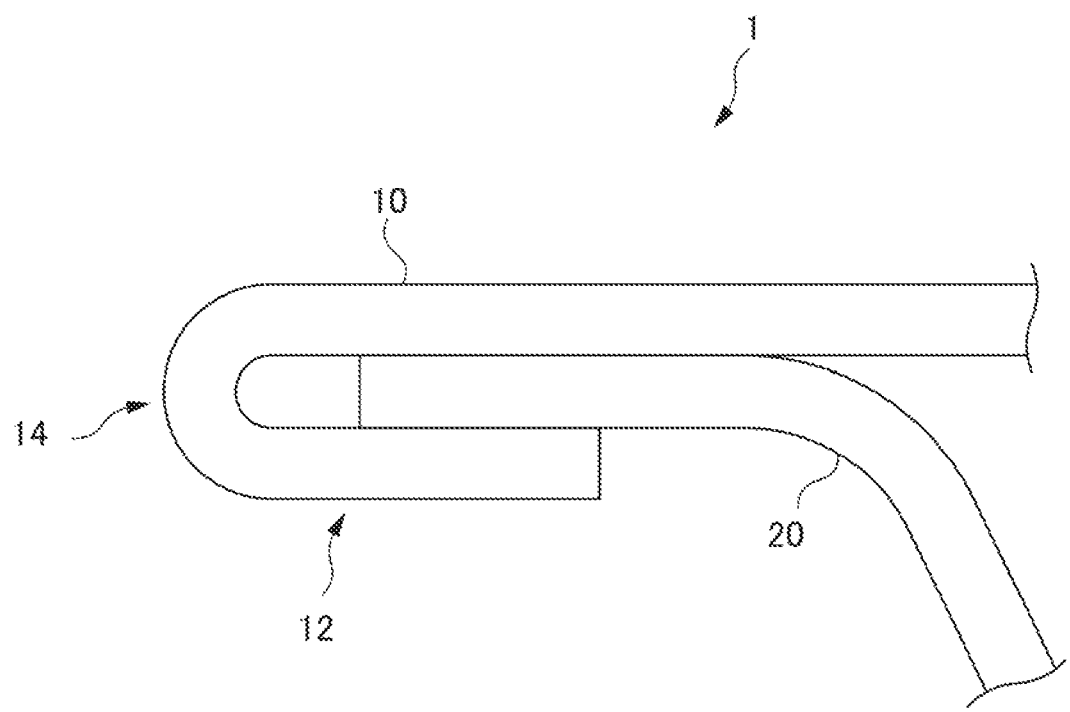
FIG. 1 is a view illustrating a cross section of a completed member.

In a method of correcting the position of a folded portion by increasing the rigidity of an inner panel included in a lid member, in the lid member such as a door member part of a vehicle, in one embodiment of the present invention, for example, a computer aided engineering (CAE) analysis is performed, an influence degree around a certain portion is calculated, and actually measured values are averaged in accordance with the influence degree. Thereby, it is possible to construct a model having a correlation, and it is possible to calculate a correction location and an amount of correction based on the model.

An outline of an accuracy management method and a manufacturing method according to the embodiment of the present invention will now be described herein. As an example, it will be described below a case where a first member and a second member both serving as sub-completed members are combined with each other to form a completed member. The accuracy management method includes a first analysis process, a second analysis process, a measurement data acquisition process, an averaging process, an adjustment process, and a rigidity changing process in this order. The manufacturing method includes a manufacturing process, in addition to the processes that the accuracy management method includes. The manufacturing process is arranged after the rigidity changing process.

In the first analysis process, a model is used to analyze a ratio of amount of change between a portion to which a load is applied and evaluation portions other than the portion on the completed member. In the second analysis process, a model is used to analyze an amount of change when a load is applied to a second member. In the measurement data acquisition process, amounts of difference from respective design values are acquired as measurement data for the first member, the second member, and the completed member. In the averaging process, the pieces of the measurement data of the first member, the second member, and the completed member undergo averaging at the ratio of amount of change on the completed member. In the adjustment process, the ratio used for the averaging is adjusted to achieve a higher correlation between a ratio of rigidity between the second member and the first member and a ratio of movement between the second member and the first member. In the rigidity changing process, when the value of the measurement data of the completed member exceeds an allowable value, the rigidity of the second member is changed based on the correlation having undergone the adjustment in the adjustment process. In the manufacturing method, furthermore, the second member that has been changed in rigidity is used to manufacture a completed member in the manufacturing process.

In the accuracy management method and the manufacturing method according to the embodiment of the present invention, where the averaging process is included, it is possible to perform an evaluation in which influences by peripheral portions are taken into account. Then, by changing the rigidity of the second member based on the evaluation, it is possible to perform a more accurate adjustment in accuracy of a completed member.

The processes will now be described herein with reference to the accompanying drawings. The accuracy management method and the manufacturing method according to the present embodiment relate to manufacturing of a completed member in which a flange of a first member is folded through hemming processing to be in surface contact with an edge of a second member to form a folded portion to join the first member and the second member to each other.

FIG. 1 is a view illustrating a cross section of a completed member 1. As an example of the completed member 1, it will be described below a case where the completed member 1 is a door member of a vehicle. As illustrated in FIG. 1, the completed member 1 includes a first member 10 and a second member 20. When the completed member 1 is a door member of a vehicle, the first member 10 serves as an outer panel of the door member. Furthermore, the second member 20 serves as an inner panel of the door member. In the first member 10, its flange 12 is folded through hemming processing to be in surface contact with an end 22 at an edge of the second member 20. Furthermore, the first member 10 is formed with a folded portion 14 after the flange 12 is folded.

<First Analysis Process>

Figure 2:
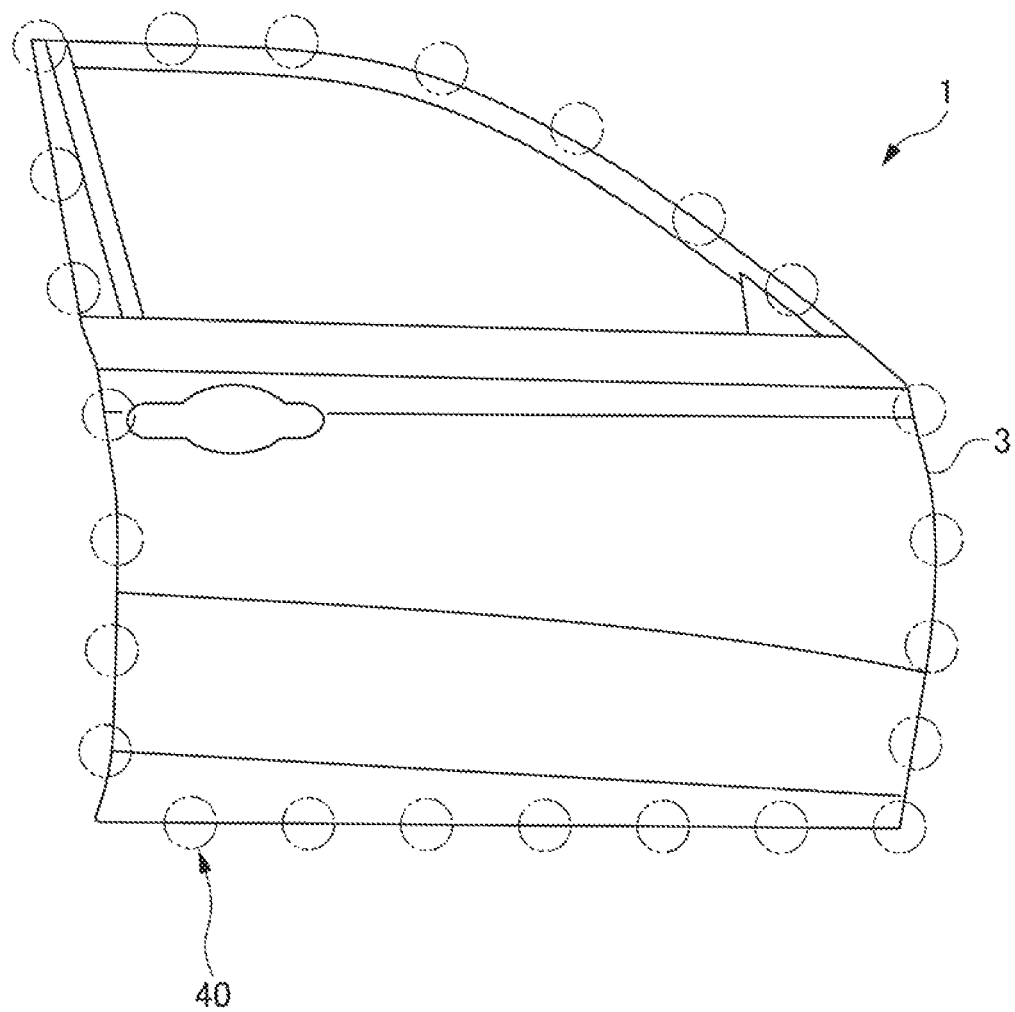
FIG. 2 is a view illustrating evaluation portions on the completed member.

In the first analysis process, a model of the completed member, that is, a model of the completed member 1 is used to analyze an amount of change when a load is applied. FIG. 2 is a view illustrating the completed member 1 and a first evaluation portion 40 on the completed member 1. A load is applied to the first evaluation portion 40. Then, an amount of change at the first evaluation portion 40 due to the applied load is acquired. As illustrated in FIG. 2, a plurality of the first evaluation portions 40 are provided on an edge 3 of the completed member 1. The edge 3 of the completed member 1 corresponds to the folded portion 14 (not illustrated in FIG. 2, but illustrated in FIG. 1) of the first member 10. It is possible to arrange the first evaluation portions 40 each at a pitch of 10 mm, for example, in a mesh pattern on the edge 3 of the completed member 1.

Figure 3A:
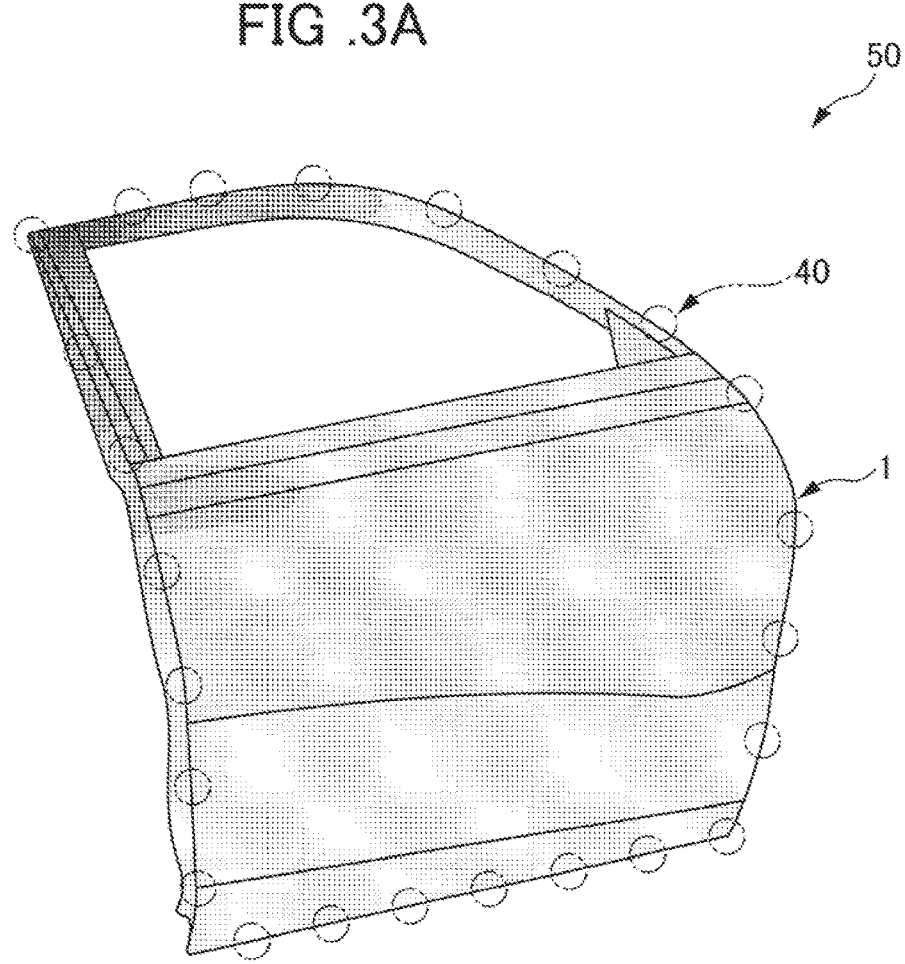
FIG. 3A is a view illustrating a model of the completed member.
Figure 3B:
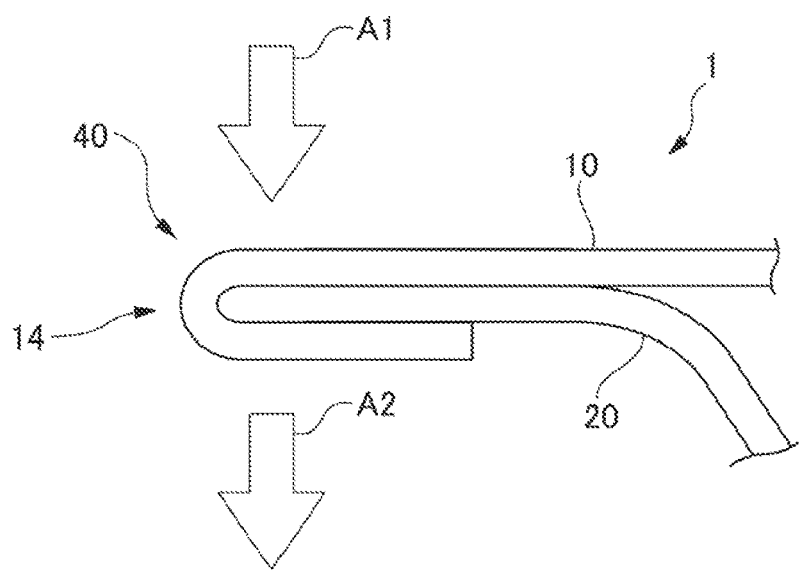
FIG. 3B is a view illustrating a cross section of the completed member.

FIG. 3 is a view for describing the model of the completed member. FIG. 3A illustrates a model 50 of the completed member. A model of a completed member refers to an evaluation model for evaluating a displacement in the completed member 1, for example. FIG. 3B illustrates a cross section of the completed member 1. As illustrated in FIG. 3A, the model of the completed member is arranged with the plurality of first evaluation portions 40 at positions similar to those illustrated in FIG. 2. Then, a displacement when a load is applied to each of the first evaluation portions 40 is acquired. FIG. 3B illustrates a load serving as an input with an arrow A1. Furthermore, FIG. 3B illustrates a displacement serving as an output with an arrow A2. As illustrated by the arrow A1 in FIG. 3B, the load is applied from outside the completed member 1 to the completed member 1. Then, as illustrated by the arrow A2 in FIG. 3B, the displacement heading toward inside the completed member 1 is acquired. An amount of the displacement serves as an amount of deformation. Note that, when the completed member 1 is a door member, outside the completed member 1 refers to a side on a vehicle outside of the door member. Furthermore, when the completed member 1 is the door member, inside the completed member 1 refers to a side on a vehicle inside of the door member. Note that, as conditions for restriction when performing an analysis, conditions equivalent to conditions for fixation using a fixing jig are set in the measurement data acquisition process described later.

The method of acquiring a displacement is described below. A load is first applied to one of the first evaluation portions 40. Amounts of deformation in response to the applied load are acquired for the one of the first evaluation portions 40, to which the load is applied, and for the other ones of the first evaluation portions 40, to each of which no load is applied. Then, for the plurality of first evaluation portions 40 provided on the folded portion 14, evaluations are performed in a similar manner. In this way, a ratio between an amount of deformation at a certain one of the first evaluation portions 40 when the load is applied to the certain one of the first evaluation portions 40 and amounts of deformation at the other ones of the first evaluation portions 40 than the certain one of the first evaluation portions 40 when the load is applied to the certain one of the first evaluation portions 40 is analyzed with a finite element method.

Figure 4:
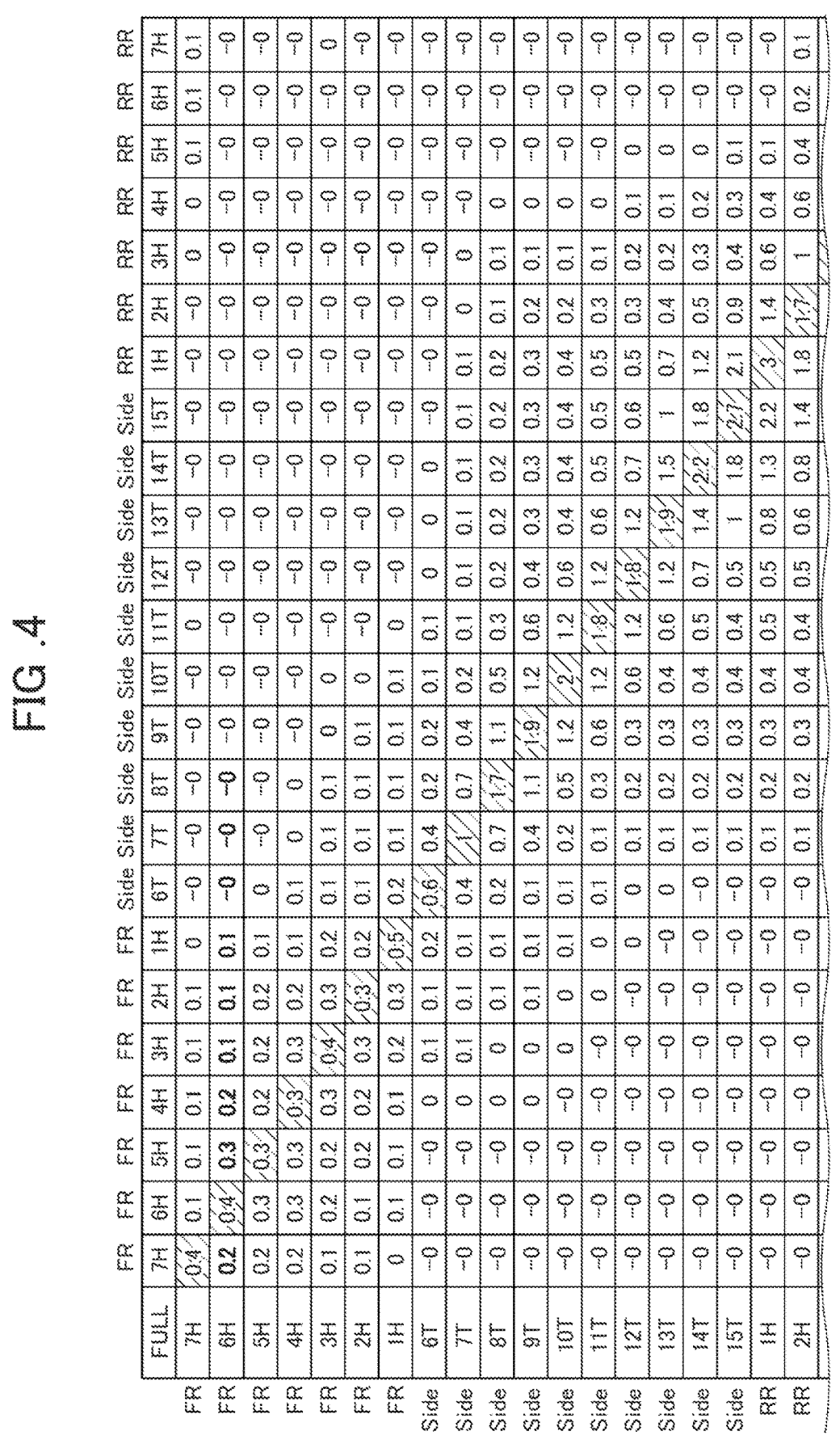

FIG. 4 is a view illustrating results of analyses in the first analysis process on the completed member 1. In the vertical column and the horizontal row in the table illustrated in FIG. 4, the positions of the first evaluation portions 40 are illustrated. Specifically, the vertical column illustrates the first evaluation portions 40 to each of which a load is applied. The horizontal row illustrates the first evaluation portions 40 from each of which an amount of deformation is acquired at that time. In the table, the numerical values illustrate the amounts of deformation. The unit used for the numerical values is millimeters (mm). In FIG. 4, 7H, 6T, etc. indicate the positions of the first evaluation portions 40. Furthermore, FULL indicates that the evaluated target is the completed member 1. FIG. 8 illustrates the FULL. Furthermore, FR, Side, and RR indicate segments of the positions of the first evaluation portions 40. A front side is indicated by FR. A lateral side is indicated by Side. A rear side is indicated by RR.

The deep-colored portions (obliquely-lined portions) in the table illustrated in FIG. 4 indicate the amounts of deformation in certain ones of the first evaluation portions 40 when a load is applied to each of the certain ones of the first evaluation portions 40. Furthermore, the other numerical values in the identical rows indicate the amounts of deformation at the other ones of the first evaluation portions 40 than each of the certain ones of the first evaluation portions 40 when a load is applied to each of the certain ones of the first evaluation portions 40. In the first analysis process, such a plurality of measurement values are used to analyze, with a finite element method, a ratio, among the plurality of first evaluation portions 40 provided on the folded portion 14, between an amount of deformation at a certain one of the first evaluation portions 40 when a load is applied to the certain one of the first evaluation portions 40 and amounts of deformation at the other ones of the first evaluation portions 40 than the certain one of the first evaluation portions 40 when a load is applied to each of the certain ones of the first evaluation portions 40. Note that the amounts of deformation illustrated in FIG. 4 correspond to amounts of deformation on the completed member 1 as described above. In the first analysis process, results of analyses, which are similar to the results of analyses illustrated in FIG. 4, may be acquired for the second member 20.

<Second Analysis Process>

In the second analysis process, a model 52 of the second member is used to analyze an amount of change when a load is applied. The model 52 of the second member refers to an evaluation model for evaluating a displacement in the second member 20, for example. In the first analysis process, the model 50 of the completed member is used to analyze an amount of deformation in the completed member 1. In the second analysis process, the second member 20 serves as a target to be analyzed. Furthermore, in the first analysis process, a ratio between amounts of deformation at one of the first evaluation portions 40, to which a load is applied, and the other ones of the first evaluation portions 40 than the one of the first evaluation portions 40 is analyzed. In the second analysis process, an amount of deformation at a second evaluation portion 42 to which a load is applied is analyzed.

Figure 5A:
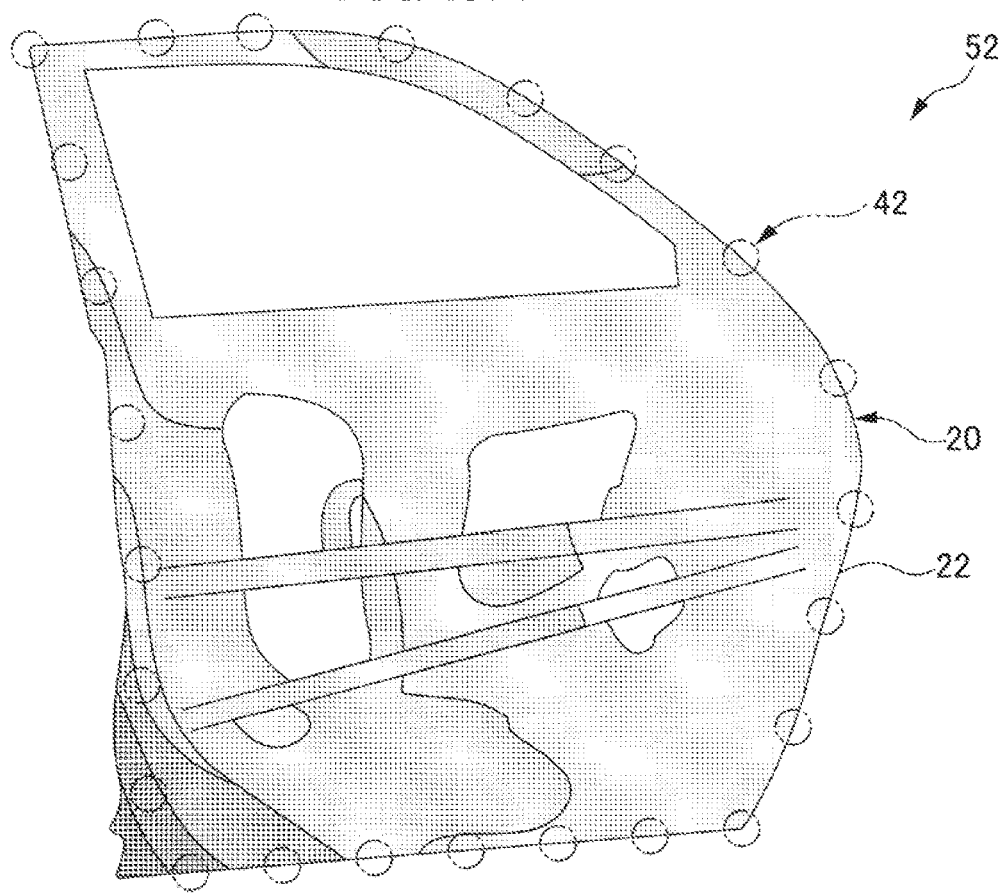
FIG. 5A is a view illustrating a model of a second member.
Figure 5B:
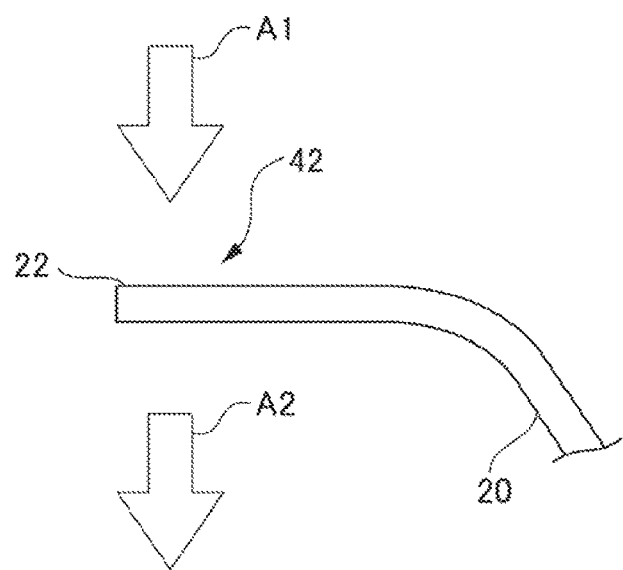
FIG. 5B is a view illustrating a cross section of the second member.

FIG. 5 is a view for describing the model 52 of the second member. FIG. 5A illustrates the model 52 of the second member. FIG. 5B illustrates a cross section of the second member 20. In the present embodiment, the second member 20 serves as an inner panel. Therefore, the model 52 of the second member is also referred to as a model of the inner panel. As illustrated in FIG. 5A, the model 52 of the second member is arranged with a plurality of the second evaluation portions 42 at positions on the end 22 at the edge of the second member 20, which correspond to those of the first evaluation portions 40 on the completed member. Then, a displacement when a load is applied to each of the second evaluation portions 42 is acquired. FIG. 5B illustrates a load serving as an input by an arrow A1. Furthermore, FIG. 5B illustrates a displacement serving as an output by an arrow A2. As illustrated by the arrow A1 in FIG. 5B, the load is applied from outside the second member 20 to the second member 20. Then, as illustrated by the arrow A2 in FIG. 5B, a displacement heading toward inside the second member 20 is acquired. An amount of the displacement serves as an amount of deformation. Note that, when the second member 20 is assembled in the door member, outside and inside the second member 20 correspond to outside and inside the door member.

Specifically, a load is applied to each of the second evaluation portions 42. Then, an amount of deformation in response to the applied load is acquired for each of the second evaluation portions 42. Then, an amount of deformation at a certain one of the second evaluation portions 42 when a load is applied to the certain one of the plurality of second evaluation portions 42 provided on the end 22 at the edge of the second member 20 is analyzed with a finite element method.

<Measurement Data Acquisition Process>

In the measurement data acquisition process, measurement data is acquired for portions corresponding to the evaluation portions on the first member 10 before having undergone hemming processing and portions corresponding to the evaluation portions on the second member 20 before having undergone hemming processing. Note herein that the portions corresponding to the evaluation portions mean the second evaluation portions 42 that are set on the model 52 of the second member in the second analysis process. Furthermore, in addition to the second evaluation portions 42, it is possible to include the first evaluation portions 40 that are set on the model of the completed member in the first analysis process.

Additionally, in the measurement data acquisition process, measurement data of the plurality of evaluation portions on the folded portion 14 of the completed member 1 formed through the hemming processing is acquired. Note that measurement data acquired in the measurement data acquisition process means an amount of difference in position, with respect to a design value.

Figure 6A:
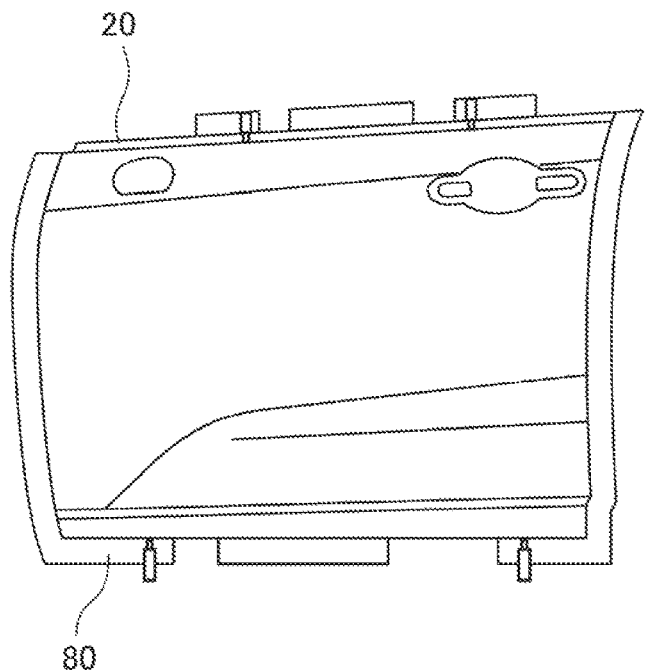
FIG. 6A is a view illustrating a fixing jig for acquiring measurement data.
Figure 6B:
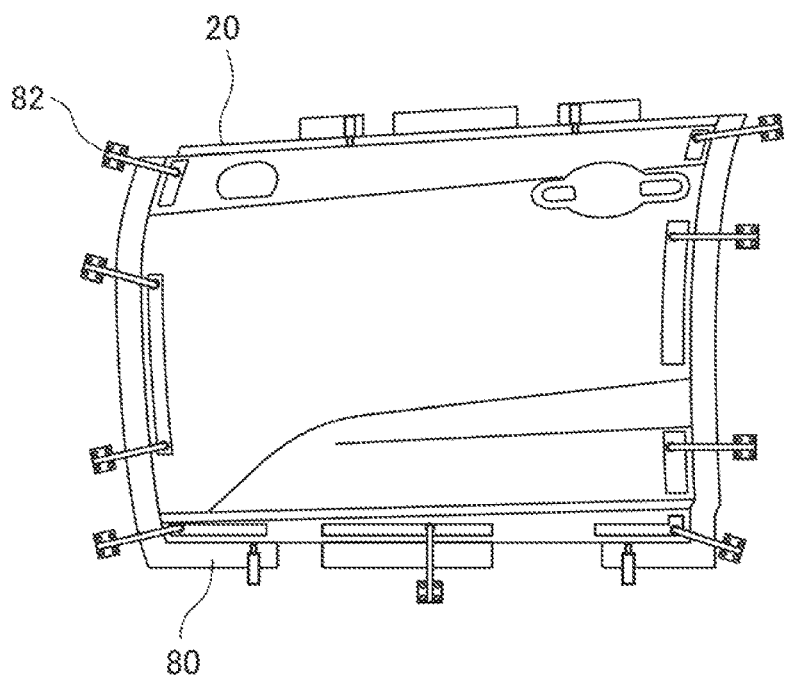
FIG. 6B is a view illustrating example points from which measurement data is acquired.

It is possible to acquire measurement data in a state where a target is fixed to a fixing jig 80. FIG. 6A and FIG. 6B are views illustrating the fixing jig 80 that is available when acquiring measurement data. FIG. 6A schematically illustrates a top view of the fixing jig 80 and the inner panel serving as the second member 20 fixed to the fixing jig 80. There is no particular limitation in the fixing jig 80, as long as it is possible to fix a target to be measured. The fixing jig 80 may have such a structure that, for example, for a workpiece arranged with a reference hole, such as an inner panel, allows the workpiece to be mounted on the fixing jig 80 using the reference hole and a reference surface, and, when it is not possible to arrange a reference hole for measurement purposes, such as an outer panel, allows a measurement reference to be provided by using such a jig that has a stereoscopic frame as illustrated in FIG. 6, with which two sides of the outer panel come into contact.

Furthermore, the fixing jig 80 may include clamps 82 for holding purposes, as illustrated in FIG. 6B.

Figure 8A:
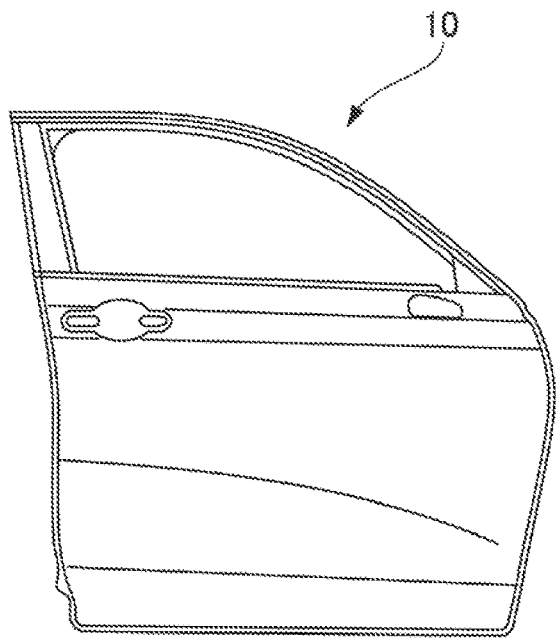
FIG. 8A is a view illustrating a target to be measured, that is, SKIN.
Figure 8B:
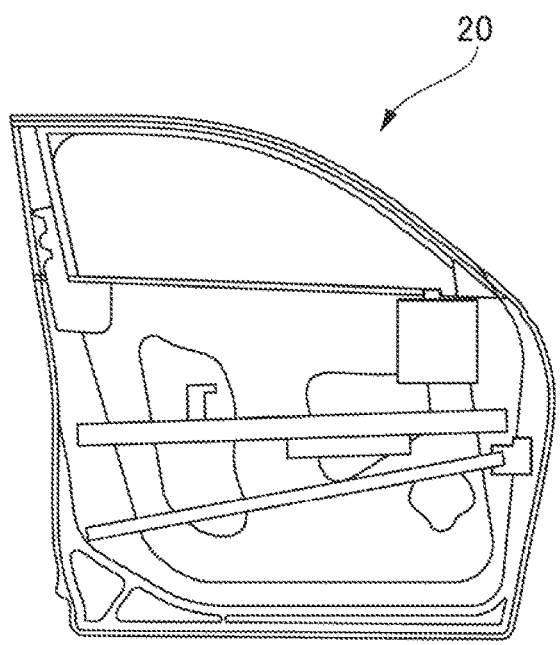
FIG. 8B is a view illustrating a target to be measured, that is, SUB.
Figure 8C:
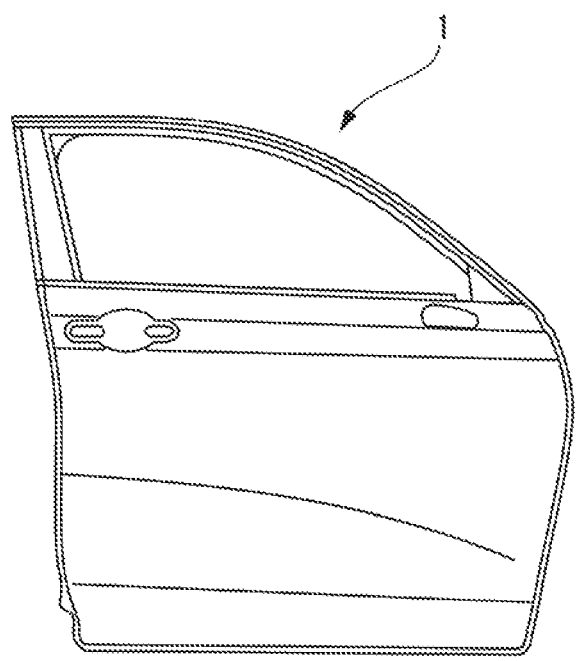
FIG. 8C is a view illustrating a target to be measured, that is, FULL.

FIG. 7 is a view illustrating the measurement data acquired in the measurement data acquisition process. In the vertical column of the table illustrated in FIG. 7, targets to be measured are indicated. There are SKIN, SUB, and FULL in this order from the top. FIG. 8 illustrates the respective targets. FIG. 8 is a view illustrating the targets to be measured. FIG. 8A illustrates SKIN, that is, an outer panel serving as the first member 10. FIG. 8B illustrates SUB, that is, an inner panel serving as the second member 20. FIG. 8C illustrates FULL, that is, a door member serving as the completed member 1. Furthermore, the steps illustrated in FIG. 7 each refer to an amount of difference in position, with respect to a design value. The numerical values in the table indicate values of such steps in terms of millimeters (mm). In FIG. 7, 7H, 6T, etc. indicate measurement positions, similar to FIG. 4. Furthermore, FR, Side, and RR also indicate segments of the measurement positions, similar to FIG. 4. A front side is indicated by FR. A lateral side is indicated by Side. A rear side is indicated by RR.

It is desirable that a median value of results of measurements of a plurality of workpieces is used as measurement data to be acquired in the measurement data acquisition process. Note herein that the workpieces refer to the first member, the second member, and the completed member 1. By using a median value of results of measurements of a plurality of workpieces as measurement data, it is possible to reduce errors that occur due to influences by a setting error occurred when an amount of displacement is measured in a state where each of the workpieces is placed on a flat surface. Note that a state where a workpiece is placed on a flat surface means a state where the workpiece is not forcibly displaced by a clamp, for example. In FIG. 7, SKIN indicates that the workpiece is measured in a state where it is placed on a flat surface.

<Averaging Process>

In the averaging process, the measurement data acquired in the measurement data acquisition process undergoes averaging. The averaging is performed in accordance with the ratio of amounts of deformation calculated in the first analysis process at the other ones of the first evaluation portions 40 than a certain one of the first evaluation portions 40, with respect to the certain one of the first evaluation portions 40. Arrows A3 illustrated in FIG. 7 indicate a range of measurement data that undergoes averaging when a ratio of amount of deformation is set to be equal to or higher than 30%, for example. In this case, for one of the first evaluation portions 40, measurement data of the other ones of the first evaluation portions 40, which fall within a range where a ratio of amount of deformation from the one of the first evaluation portions 40 is equal to or higher than 30%, is allowed to undergo averaging. The resultant data is thus used as measurement data of the one of the first evaluation portions 40. Note that a ratio of amount of change, which is used when performing averaging, is then adjusted in the next process, that is, the adjustment process.

<Adjustment Process>

In the adjustment process, the ratio used in the averaging process is adjusted. In the adjustment, the ratio is adjusted to achieve a higher correlation between a ratio of rigidity and a ratio of movement for the second member and the first member. Therefore, in the adjustment process, a ratio of rigidity between the second member and the first member is first acquired. It is possible to acquire a ratio of rigidity from a result of analysis using the model of the completed member used in the first analysis process and a result of analysis using the model of the second member used in the second analysis process.

When acquiring a ratio of rigidity, a difference between the result of analysis of the completed member in the first analysis process and the result of analysis of the second member in the second analysis process is calculated to serve as a result of analysis of the first member. That is, Displacement in the first member (outer panel (SKIN))=Displacement in the completed member (door member (FUL))−Displacement in the second member (inner panel (SUB)), and Ratio of rigidity=Displacement in the second member (inner panel (SUB))/Displacement in the first member (outer panel (SKIN))=Displacement in the second member (inner panel (SUB))/(Displacement in the completed member (door member (FUL))−Displacement in the second member (inner panel (SUB))). Note that, as a method of acquiring a ratio of rigidity, it has been described, as an example, a method of calculating the rigidity using an amount of displacement when a load to be applied to an evaluation portion when performing an analysis is not changed in both the first analysis process and the second analysis process, and a load to be applied per evaluation portion is set to an identical load. However, the rigidity refers to a ratio between a load and an amount of movement. For example, a load "N" that is required to cause a displacement of 0.5 mm may be set as the rigidity.

By calculating a value on the single first member 10 to serve as a result of analysis from a difference between the completed member 1 and the second member 20, without using a result of analysis on the single first member, as described above, it is possible to handle a value on the single first member 10 to serve as a result of analysis in which influences by deformation caused by the second member 20, that is, the inner panel are taken into account. Thereby, it is possible to acquire a result of analysis in which actual deformation is taken into account.

A ratio of movement is calculated using the measurement data having undergone the averaging in the averaging process. Specifically, a ratio of movement is calculated from the amount of movement of the first member (outer panel (SKIN)), which has undergone averaging, and the amount of movement of the second member (inner panel (SUB)), which has undergone averaging. That is, Ratio of movement=Amount of movement of the first member (outer panel (SKIN)), which has undergone averaging/Amount of movement of the second member (inner panel (SUB)), which has undergone averaging. Note herein that an amount of movement means an amount of deformation due to hemming.

Figure 9:
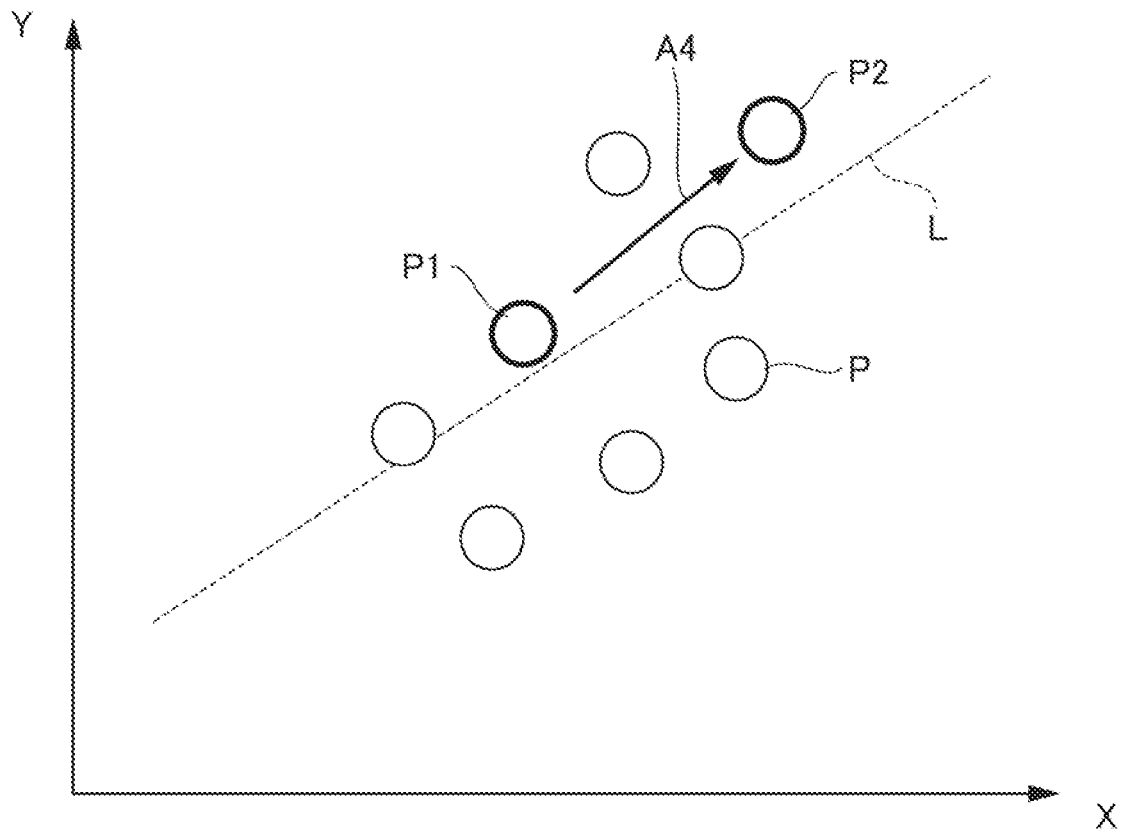
FIG. 9 is a view illustrating a correlation between a ratio of rigidity and a ratio of movement.

FIG. 9 is a view illustrating a correlation between a ratio of rigidity between the first member 10 and the second member 20 and a ratio of movement between the second member 20 and the first member 10. The X axis of the graph illustrated in FIG. 9 indicates a ratio of rigidity between the first member 10 and the second member 20. The Y axis of the graph illustrated in FIG. 9 indicates a ratio of movement, that is, a ratio of amount of movement, between the second member 20 and the first member 10. The ratio used in the averaging process is adjusted to achieve a higher correlation between the ratio of rigidity and the ratio of movement. Specifically, the ratio is adjusted to allow a plurality of plots P corresponding to evaluation portions to be highly correlated into a single relation. Note herein that, highly correlated means that the relation of the plurality of plots P is approximated into a single line L indicating a prediction expression, similar to the line L illustrated in FIG. 9, for example.

<Rigidity Changing Process>

In the rigidity changing process, the rigidity of the second member 20 is changed to allow the value of the measurement data of the completed member 1 to fall within a range of allowable values. Then, the second member 20 is used to perform correction for the completed member 1 to allow the value of the measurement data (the ratio of movement) of the completed member 1 to fall within the range of the allowable values. When the completed member 1 serves as a door member and the second member 20 serves as an inner panel, it is not easy to change the rigidity of an outer panel since the outer panel relates to the design. Therefore, it is desirable to change the position of the completed member by changing the rigidity of the inner panel. However, due to the recent increases in the rigidity of outer panels, it becomes important to correct the morphology of the completed member 1 using the second member 20. When changing the second member in rigidity, the rigidity is determined based on the correlation having undergone adjustment in the adjustment process. By changing the rigidity, a value of measurement data (a ratio of movement) of each of the first evaluation portions 40 on the completed member 1 is allowed to be below an allowable value. By changing the rigidity of the second member 20, for example, it is possible to move a point P1 illustrated in FIG. 9 to a point P2 along with a relation of the line L, as indicated by an arrow A4. That is, by adjusting the rigidity, it is possible to adjust an amount of movement. Note that a member to be changed in rigidity is not limited to the second member 20. By changing the rigidity of the first member 10, it is also possible to adjust an amount of movement.

The accuracy management method according to the present embodiment includes the series of processes from the first analysis process to the rigidity changing process, as described above. The manufacturing method according to the present embodiment includes the manufacturing process after the rigidity changing process, in addition to the first analysis process to the rigidity changing process. The manufacturing process will now be described herein.

<Manufacturing Process>

In the manufacturing process, the second member 20 that has been changed in rigidity in the rigidity changing process is used to manufacture the completed member 1. Thereby, it is possible to manufacture the completed member 1 where a value of measurement data is below an allowable value.

EXPLANATION OF REFERENCE NUMERALS

1 Completed member (door member, FULL)
3 Edge of completed member
10 First member (outer panel, SKIN)
12 Flange
14 Folded portion
20 Second member (inner panel, SUB)
22 End of edge
40 First evaluation portion (evaluation portion)
42 Second evaluation portion (evaluation portion)
50 Model of completed member
52 Model of second member
80 Fixing jig
82 Clamp
A1 Load (input)
A2 Displacement (output)
A3 Averaging range

What is claimed is:

1. A manufacturing method for a completed member in which a flange of a first member is folded through hemming processing to be in surface contact with an edge of a second member to form a folded portion to join the first member and the second member to each other, the manufacturing method comprising:
  a first analysis process of analyzing, with a finite element method using a model of the completed member, a ratio, among a plurality of evaluation portions provided on the folded portion, between an amount of deformation at a certain one of the evaluation portions when a load is applied to the certain one of the evaluation portions and amounts of deformation at other ones of the evaluation portions than the certain one of the evaluation portions when the load is applied to the certain one of the evaluation portions;
  a second analysis process of analyzing, with a finite element method using a model of the second member, and when a load is applied to each of a plurality of evaluation portions provided on an end at an edge of the second member, an amount of deformation at the certain one of the evaluation portions;
  a measurement data acquisition process of acquiring measurement data of portions corresponding to the plurality of evaluation portions on the first member and the second member before having undergone the hemming processing and measurement data of a plurality of evaluation portions on the folded portion of the completed member formed through the hemming processing;
  an averaging process of performing averaging on the measurement data in accordance with a ratio of amounts of deformation calculated in the first analysis process at the other ones of the evaluation portions than the certain one of the evaluation portions, with respect to the certain one of the evaluation portions;
  an adjustment process of adjusting the ratio to achieve a higher correlation between a ratio of rigidity between the second member and the first member, calculated from results of analyses in the first analysis process and the second analysis process, and a ratio of movement between the second member and the first member in the measurement data, calculated from the measurement data having undergone the averaging in the averaging process;
  a rigidity changing process of changing, when a value of the measurement data at one of the evaluation portions on the completed member exceeds an allowable value, rigidity of the second member based on the correlation having undergone the adjustment in the adjustment process to allow the value of the measurement data to be below the allowable value; and
  a manufacturing process of manufacturing the completed member using the second member that has been changed in rigidity in the rigidity changing process.

2. An accuracy management method of managing, when a flange of a first member is folded through hemming processing to be in surface contact with an edge of a second member to form a folded portion to join the first member and the second member to each other to form a completed member, accuracy of the folded portion, the accuracy management method comprising:
  a first analysis process of analyzing, with a finite element method using a model of the completed member, a ratio, among a plurality of evaluation portions provided on the folded portion, between an amount of deformation at a certain one of the evaluation portions when a load is applied to the certain one of the evaluation portions and amounts of deformation at other ones of the evaluation portions than the certain one of the evaluation portions when the load is applied to the certain one of the evaluation portions;

a second analysis process of analyzing, with a finite element method using a model of the second member, and when a load is applied to each of a plurality of evaluation portions provided on an end at an edge of the second member, an amount of deformation at the certain one of the evaluation portions;

a measurement data acquisition process of acquiring measurement data of portions corresponding to the plurality of evaluation portions on the first member and the second member before having undergone the hemming processing and measurement data of a plurality of evaluation portions on the folded portion of the completed member formed through the hemming processing;

an averaging process of performing averaging on the measurement data in accordance with a ratio of amounts of deformation calculated in the first analysis process at the other ones of the evaluation portions than the certain one of the evaluation portions, with respect to the certain one of the evaluation portions;

an adjustment process of adjusting the ratio to achieve a higher correlation between a ratio of rigidity calculated from results of analyses in the first analysis process and the second analysis process between the second member and the first member and a ratio of movement calculated from the measurement data having undergone the averaging in the averaging process between the second member and the first member in the measurement data; and a rigidity changing process of changing, when a value of the measurement data at one of the evaluation portions on the completed member exceeds an allowable value, rigidity of the second member based on the correlation having undergone the adjustment in the adjustment process to allow the value of the measurement data to be below the allowable value.

3. The accuracy management method according to claim 2, wherein, in the measurement data acquisition process, a median value of results of measurements of a plurality of workpieces is used as the measurement data.

4. The accuracy management method according to claim 2, wherein, in the adjustment process, a difference between a result of analysis of the completed member in the first analysis process and a result of analysis of the second member in the second analysis process is calculated to serve as a result of analysis of the first member.

* * * * *